(12) United States Patent
Andersen

(10) Patent No.: US 7,471,430 B1
(45) Date of Patent: Dec. 30, 2008

(54) HOLOGRAPHIC IMAGE CORRECTOR

(75) Inventor: Geoff P. Andersen, Colorado Springs, CO (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 284 days.

(21) Appl. No.: 11/415,475

(22) Filed: May 2, 2006

Related U.S. Application Data

(63) Continuation-in-part of application No. 09/427,457, filed on Oct. 16, 1999, now abandoned, and a continuation-in-part of application No. 08/990,260, filed on Dec. 15, 1997, now abandoned, and a continuation-in-part of application No. 08/990,257, filed on Dec. 15, 1997, now abandoned.

(51) Int. Cl.
*G02B 5/32* (2006.01)
(52) U.S. Cl. .......................................... 359/16; 359/15
(58) Field of Classification Search ..................... 359/1, 359/3, 15, 30, 16
See application file for complete search history.

(56) References Cited

U.S. PATENT DOCUMENTS

| | | | | |
|---|---|---|---|---|
| 3,598,466 A | * | 8/1971 | Friedl | 359/3 |
| 3,749,469 A | * | 7/1973 | Gayeski | 359/1 |
| 4,478,481 A | * | 10/1984 | Fusek et al. | 359/30 |
| 4,902,100 A | * | 2/1990 | Reynolds et al. | 359/15 |

* cited by examiner

*Primary Examiner*—Audrey Y Chang
(74) *Attorney, Agent, or Firm*—AFMCLO/JAZ; Thomas C. Stover

(57) ABSTRACT

The invention provides a holographic image corrector in a microscope, which employs an optical system that has as an objective a lens or mirror. The characteristics of the objective are recorded by sending a first laser beam through a spatial filter (or an array of pinholes) and then through the objective, if a lens or reflecting the beam therefrom, if a mirror, to form an objective beam. Means are provided for directing a laser reference beam also through a spatial filter (or an array of pinholes) and intersecting same with the object beam in a recording medium, to form a hologram thereof. Then means illuminate the article to be viewed with a laser beam so that light therefrom passes through the objective or reflects therefrom and through the hologram, to correct for aberrations in the objective and provide a relatively clear image of the article.

16 Claims, 11 Drawing Sheets

The recording of the hologram

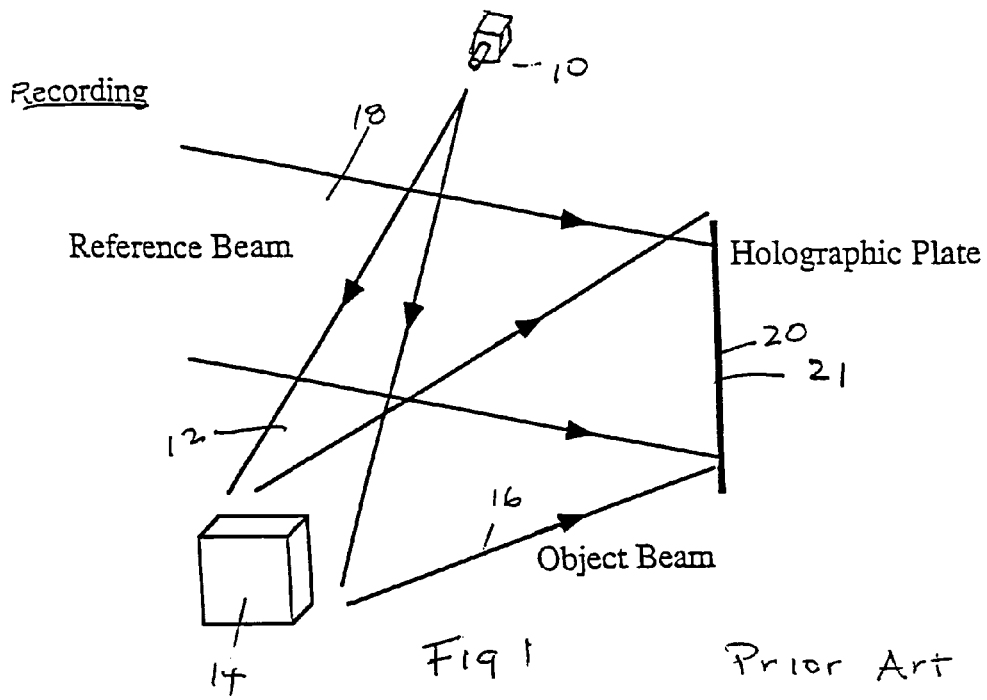
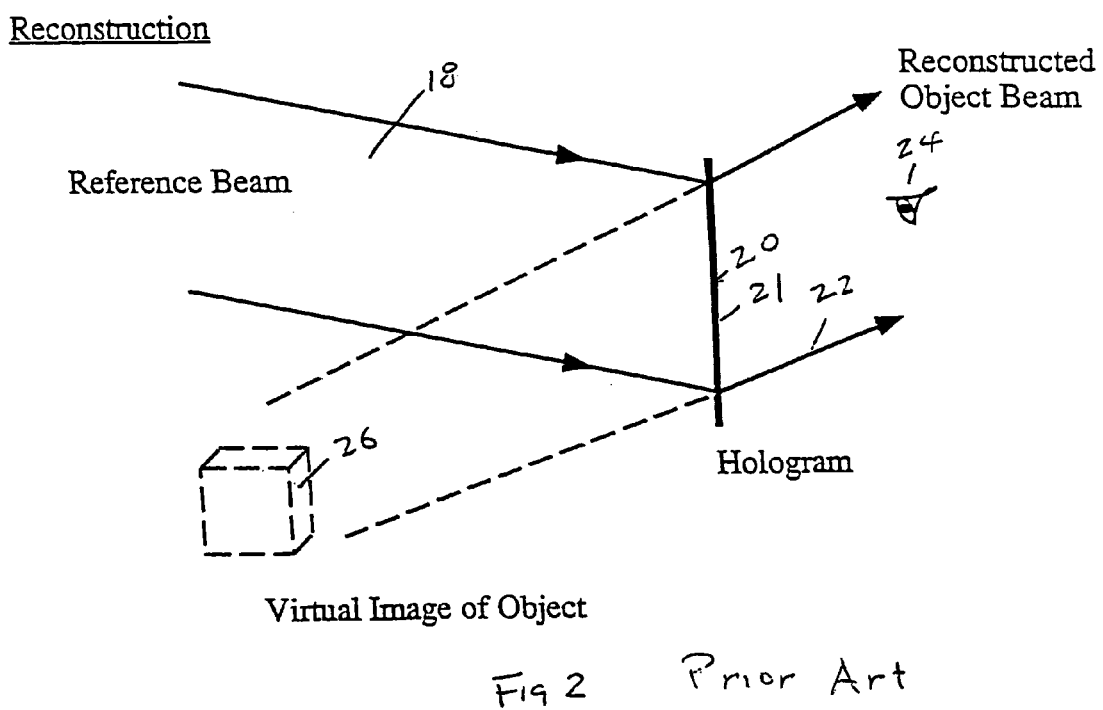

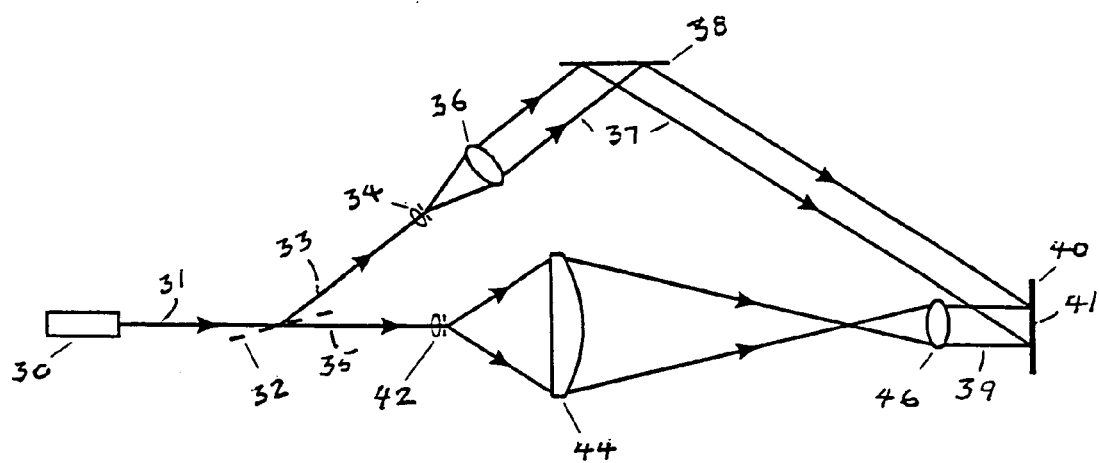
Figure 3 The recording of the hologram

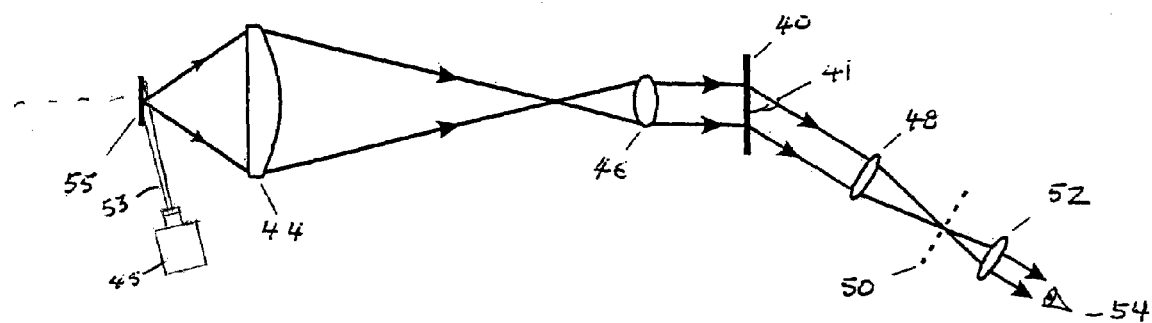
Figure 4: The reconstruction of the hologram

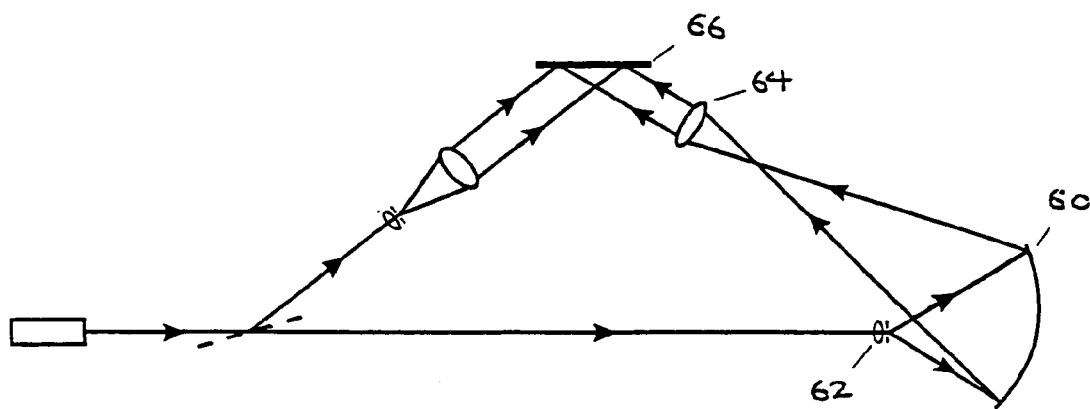
Figure 5: The recording of the hologram for a reflecting objective

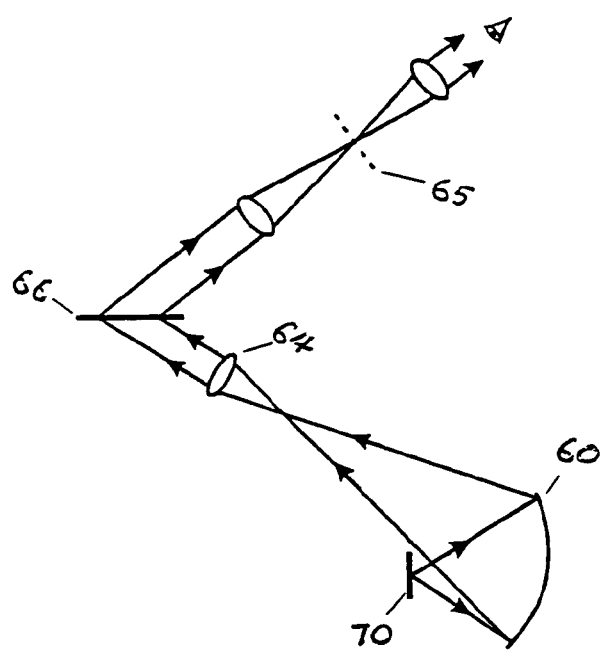
Figure 6: The reconstruction of the hologram for a reflecting objective

Fresnel lens

Zone plate (a binary amplitude z.p.)

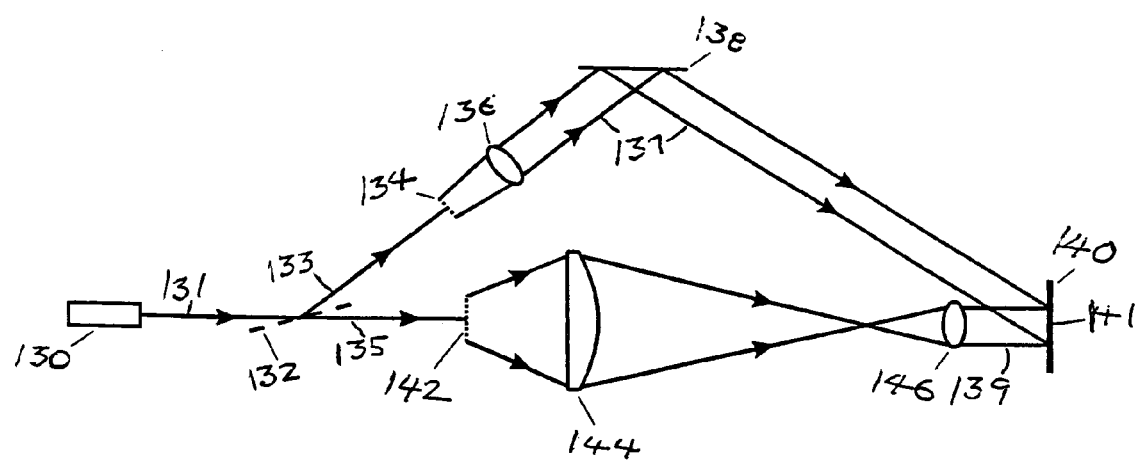
Figure 11: The recording of the hologram

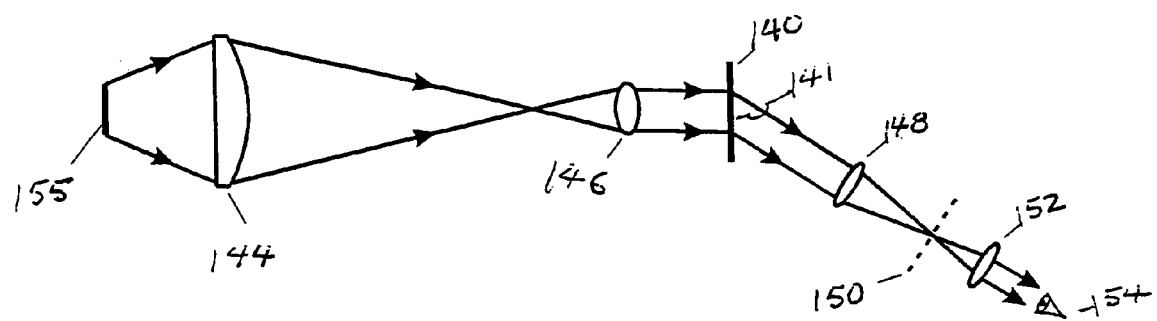
Figure 12: The reconstruction of the hologram

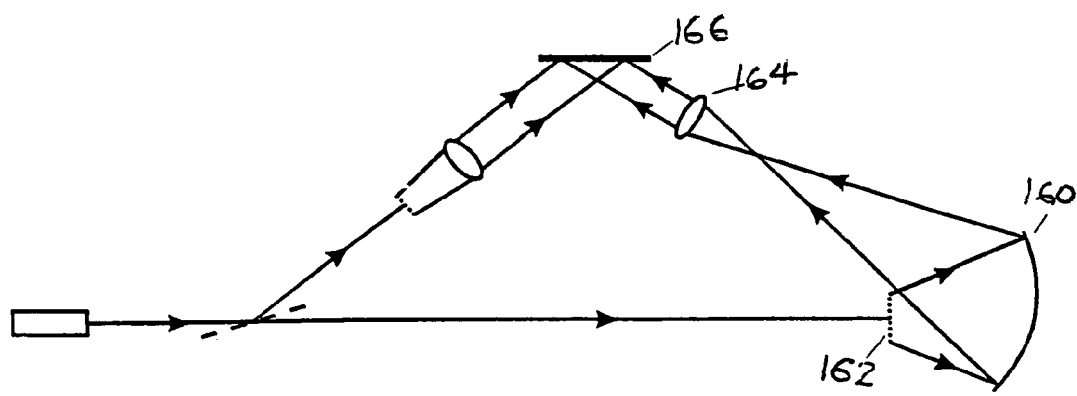
Figure 13: The recording of the hologram

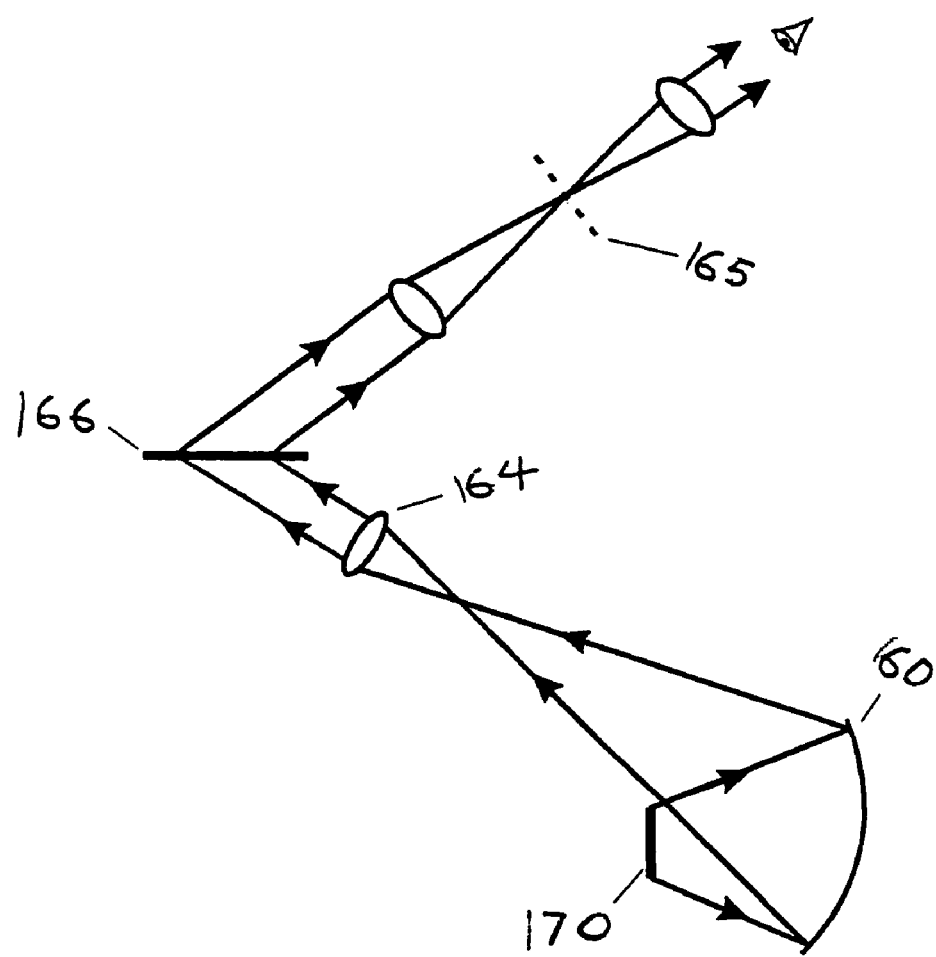
Figure 14: The reconstruction of the hologram

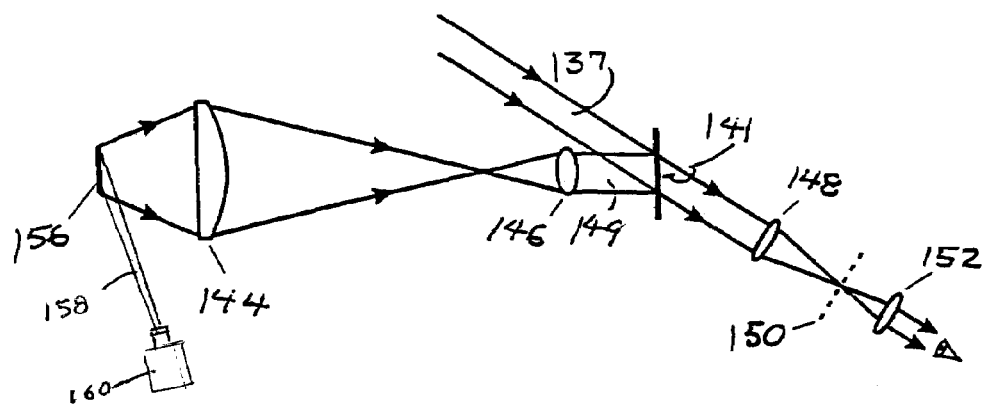
Figure 15: The reconstruction of the hologram in intereference mode. Both beams are collinear and coherent.
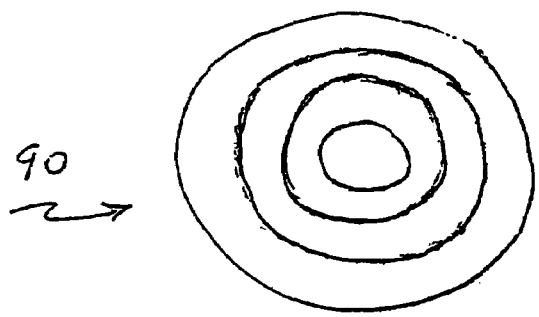
Fig 16

HOLOGRAPHIC IMAGE CORRECTOR

DOMESTIC PRIORITY

This CIP application claims the benefit of patent application Ser. Nos. 08/990,257 now abandoned and 08/990,260 now abandoned, both filed in the USPTO on 15 Dec. 1997, in the name of the inventor herein and of CIP application Ser. No. 09/427,457, filed on 16 Oct. 1999 now abandoned of the same inventor and title as above.

STATEMENT OF GOVERNMENT INTEREST

The invention described herein may be manufactured and used by or for the Government for governmental purposes without the payment of any royalty thereon.

FIELD OF THE INVENTION

This invention relates to imaging optics, particularly corrective imaging optics and method therefor.

BACKGROUND OF THE INVENTION

Imaging optics, for example, optical microscopes have used very small, high quality objectives, usually lenses. These objectives require large ratios of diameter to focal length (called numerical aperture) in order to obtain high resolution. If the sample is a distance d away from an objective with diameter D, then the numerical aperture is given by:

$$N.A. = \frac{D}{\sqrt{4d^2 + D^2}}$$

At a wavelength $\lambda$, such an objective will be able to resolve details of size x, given by;

$$x = \frac{\lambda}{2N.A.}$$

The lenses must also be made small, as the amount of spherical aberration (and chromatic aberration) in a lens increases with diameter. This means that the distance from the sample to the object must be small as well. In most cases, to further reduce the effect of spherical aberration, a combination of several custom designed lenses are used. It is impossible to manufacture a single element, large diameter, large numerical aperture lens which has no spherical aberration. For multi-element lenses the costs usually outweigh the benefits. In the case of reflecting objectives, the spherical aberration can be reduced more easily, but with the added complication that the sample will sit in front of the mirror and obscure the reflected light.

Another problem with high-power lenses is their small field of view. Parts of an object in the center of the field may be sharply imaged, but towards the edges of the image other aberrations are present which will degrade the quality of the image. To reduce the effect of these aberrations the distance from the sample to the object must be small along with the aperture. Again, it is impossible to manufacture a single element, large diameter, large numerical aperture lens which has no spherical aberration, let alone any useful field of view. In most cases, to reduce the effect of spherical aberration, a combination of several custom designed lenses are used.

Multi-element lenses are very costly and even with the best objectives available, the working distance and useful field of view is small. Except for the design of specific multi-element objectives, there are no inexpensive methods for providing an increased field of view for a microscope. A wide field of view is simulated in most microscopes by quickly scanning the subject under a single, central point of high magnification.

Also, many schemes using holography for obtaining better microscopic images have been suggested. These include taking holograms of the object through a conventional microscope and then using the information contained in the hologram to produce large scale, aberration-free images of the object. This method relies on the use of a high quality microscope to begin with and, as such, has the usual problems associated with such methods including small working distance and expensive optical components. Other methods have corrected for the optics in a poor-quality microscope by holographic correction of the microscope optics, but these still require a second, high quality microscope for final viewing of the images. Both of these methods also suffer from the fact that the hologram is uniquely recorded for every sample, which is a problem when it comes to observing objects in real-time.

In the prior art is U.S. Pat. No. 5,426,521 to Chen et al (1995) which discloses correction of aberrations (which have to be first calculated) in an optical system by employing a liquid crystal panel which simulates a hologram from the calculations Also U.S. Pat. No. 5,657,168 to Maruyama et al (1997) discloses correcting aberration of an objective lens with an element having almost no power. However neither of these references discloses correcting aberrations in an optical system by use of a true hologram. And there is need and market for such aberration correction which permits relatively clear images to be obtained from flawed and thus low cost objectives.

There has now been discovered method and apparatus for correcting aberrations in an objective optical system that permits the use of relatively large and/or low cost objectives such as a lens or mirror, in which the imperfections thereof can be reduced or nullified to obtain an improved image of the object so viewed.

SUMMARY OF THE INVENTION

Broadly the invention provides an image corrector which includes,
 a) an optical system having an objective,
 b) means for recording the characteristics of the objective by sending a first coherent beam therethrough or reflecting the beam therefrom to form an objective beam,
 c) means for intersecting the objective beam with a coherent reference beam in a recording medium to form a hologram thereof and
 d) means to illuminate an object with a coherent beam so that light therefrom passes through or reflects off of the objective and defracts through or off the hologram, to reduce or correct aberrations in the objective and provide a relatively clear image of the object.

The image corrector of the invention also provides for an aberration correction of an optical system, e.g., a microscope, including where such system is of relatively large working distance from the object being viewed.

DEFINITIONS

By "objective", as used herein, is meant a lens or concave mirror.

By "working distance", as used herein, is meant the distance between the objective and the object being viewed.

BRIEF DESCRIPTION OF THE DRAWINGS

The invention will be come more apparent from the following detailed specification and drawings in which:

FIGS. 1 and 2 are schematic elevation views of hologram formation and use per the prior art;

FIG. 3 is a schematic elevation view of recording of a hologram per the present invention;

FIG. 4 is a schematic elevation view of a reconstruction of the hologram of FIG. 3;

FIG. 5 is a schematic elevation view of the recording of a hologram of a reflecting objective per the present invention;

FIG. 6 is a schematic elevation view of a reconstruction of the hologram of FIG. 5 and FIGS. 7-10 are side and front elevation views of two elements employed in the objective optical system embodying the present invention.

FIG. 11 is a schematic elevation view of recording of a hologram per the present invention;

FIG. 12 is a schematic elevation view of a reconstruction of the hologram of FIG. 11;

FIG. 13 is a schematic elevation view of the recording of a hologram of a reflecting objective per the present invention;

FIG. 14 is a schematic elevation view of a reconstruction of the hologram of FIG. 13;

FIG. 15 is a schematic elevation view of a reconstruction of a hologram related to that of FIG. 11 in another embodiment of the invention and FIG. 16 is a schematic plan view of a fringed hologram pattern reconstructed per the embodiment of FIG. 15.

DESCRIPTION OF PREFERRED EMBODIMENTS

Figure 7:
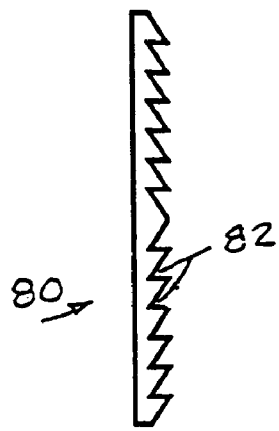

As to the Embodiments of FIGS. 1-10

As indicated above, there are at least two steps in employing the objective optical system of the invention or image corrector (which can be employed, e.g., as a microscope). The first step is writing (exposing) the hologram to record information about the objective. The second step involves using the hologram to correct for the aberrations introduced by the objective when viewing an object. These steps are shown in FIGS. 3 & 4 and described in claim 2 for example.

A hologram is a diffractive element created by the combination of at least two coherent light sources (see FIGS. 1&2). Where these two beams 16 & 18 intersect, an interference pattern is produced. A record of this pattern is the hologram 21. The major property of this hologram is that if one of the original beams used to write the hologram is directed onto the recorded pattern, part or all of the light will diffract off to create a reconstruction of the wavefront of the other beam.

In the case of a microscope design, the hologram is created by the interference of an optically perfect wave (the reference beam) with a heavily distorted wave from a poor quality objective (the object beam). After recording, light from the objective will be used to recreate the undistorted wavefront of the reference beam in passing through the hologram, to produce a perfect image. The resolution of the objective is retained, but with none of the associated aberrations.

It should be mentioned that holograms can be recorded in several different ways, either in a permanent medium such as photosensitive film, photopolymers or fixable photorefractive crystals. In these materials, the hologram is a static record of the interference pattern between the two beams at a particular instant in time. Other recording possibilities include real-time media such as four-wave mixing in photorefractive materials or various types of spatial light modulators in which the hologram is continuously and simultaneously recorded and reconstructed. This invention of a holographically corrected microscope can be adapted to suit any type of hologram, though is probably best suited to a fixed, permanent medium. Further, it is not essential that visible light be used, since many of these media can be used in other regions of the electromagnetic spectrum. In fact for higher resolution it would be preferable to use light in the UV or X-ray part of the spectrum. The generic term "light" is meant to include all of these possibilities.

The writing of the hologram (FIG. 3) begins with a source of coherent light 31, such as a laser 30 which is split into two separate beams 33 & 35 by a beam splitter 32. One of these beams 33 passes through a spatial filter 34. A spatial filter is a lens/pinhole combination used to "clean up" a laser beam by removing all high spatial frequencies. The lens in the spatial filter focuses the beam through a pinhole of such a small size that only the lowest order spatial frequency can pass through.

After being spatially filtered, the expanding beam is collimated by a high quality lens 36 to produce a diffraction limited plane wave reference beam 37. A beam is said to be diffraction limited if the phase of the wavefront nowhere exceeds a quarter of the wavelength of the light. Such a beam is generally recognized as being optically perfect, and any improvement on the phase error of the wavefront will produce a negligible effect to an image formed using this beam.

The second laser beam 35 also passes through a spatial filter 42 to illuminate the objective element 44. It is important that the pinhole in the spatial filter be smaller than the resolution limit of a perfect objective of the same numerical aperture. The objective element can be either refractive, such as the lens 44 shown in FIGS. 3 &4 or reflective, such as the curved mirror 60, shown in FIGS. 5 & 6. The objective focuses the light through an imaging lens 46, which images the objective onto a suitable light sensitive material 40. This material can be one of many suitable media for recording interference patterns such as photosensitive films, nonlinear crystals, photopolymers or spatial light modulators in either a fixed medium or a real-time medium. This beam forms the object beam 39 and the two lenses 44 & 46 are the basis of a microscope. It is noted that the secondary lens 46 need not be a high quality lens, though the better the quality, the better the performance of the resulting microscope.

The reference beam 37 is made to interfere with the object beam 39 at the film 40. In FIG. 3, this is done using a reflection of a single directing mirror 38, but in practice, any number of mirrors (or none at all) can suffice, so long as the reference beam 37 is made to intersect the object beam 39 at the plate 40. The recorded interference pattern is the hologram 41.

After processing, the reconstruction process takes place (FIG. 4). The spatial filter 42 from the recording process, is removed, e.g., by hand or device and replaced by the object (or article) to be viewed 55, which article is illuminated as described below. Light transmitted through, or reflected from the point or area on the object where the original pinhole was located, will pass through the objective 44 and imaging lens 46, and through the hologram 41 for viewing the article. It is important to note that the relative positions of the objective, imaging lens and hologram (parts 44, 46 and 40) are best kept the same as they were for the recording of the hologram.

Since the beam incident on the hologram matches the wavelength λ of the original object beam 39 used to record the hologram, it will diffract off the hologram to reconstruct the original, diffraction limited reference beam, with article information retained. By focusing this beam down with a high quality lens 48, a diffraction limited real image of a point (or area) on the object can be captured, at the image plane 50, on a suitable recording medium, for example a still-frame camera or a movie camera. An alternative is to view the virtual image directly, using an eyepiece lens 52.

That is, the article 55 of FIG. 4, is desirably illuminated by a laser beam of matching λ from laser emitter 45, which beam reflects off the article 55, back through the objective 44, imaging lens 46, the hologram 41 and through focusing lens 48 to the image plane 50, for corrected viewing as discussed above.

The above article illuminating system can also be employed in FIGS. 6, 12, 14, and 15, per the invention. Thus as shown in FIG. 15, laser beam 158 from laser emitter 160, illuminates article 156 at the matching λ.

Since the wavefront aberrations from nearby points on the object are very similar, the hologram will also correct for a small field of view around the central object point. This will mean that the device operates like a conventional microscope. The exact magnification achievable depends on the power of the lenses (44, 46 and 48) as well as the actual distances used (i.e. between Parts 42 & 44 and 44 & 46).

As mentioned previously, the objective can be a concave mirror 60, and the recording and reconstruction set-up for this reflecting microscope are shown in FIGS. 5 and 6 respectively. In this case, per FIG. 5, the spatial filter 62, which illuminates the mirror 60 is on the same side as the imaging lens 64. In order to separate the incident and reflected light, the mirror 60 is tilted into an off-axis configuration. This will introduce a large amount of off-axis aberrations for a heavily curved mirror, but these are recorded and corrected by the hologram 66 as is done by the hologram 41 of the refractive system of FIG. 4. It must be noted that this off-axis angle is not required, but is most likely to be desired to avoid the sample getting in the way of the return light under observation.

Then, per FIG. 6, the spatial filter 62 is removed and replaced by the object 70 to be viewed at the image plane 65. The remaining lenses of the optical systems shown in FIGS. 5 & 6 correspond to those shown and described relative to FIGS. 3 & 4.

Instead of a conventional lens or even a curved mirror as the objective, any optical element which can image objects, though badly, can be used as the objective element. Once again, any aberrations present can be corrected for, using this technique, resulting in a near perfect microscope. Examples of other such focusing elements are Fresnel lenses and Zone plates, further discussed below.

Figure 8:
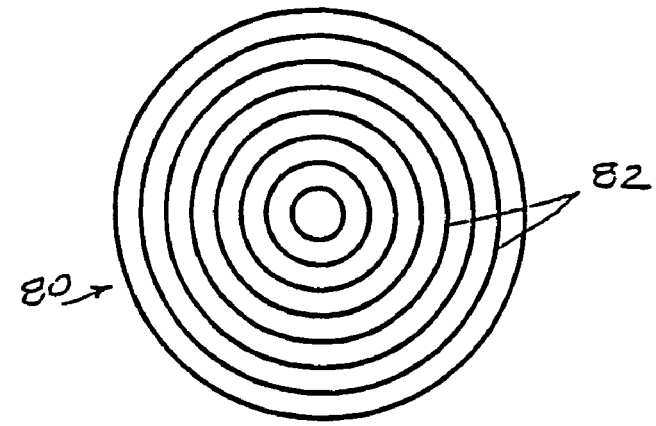
Figure 9:
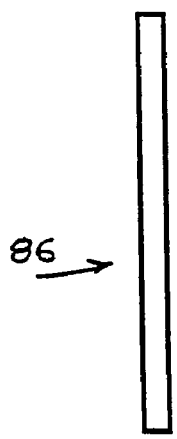
Figure 10:
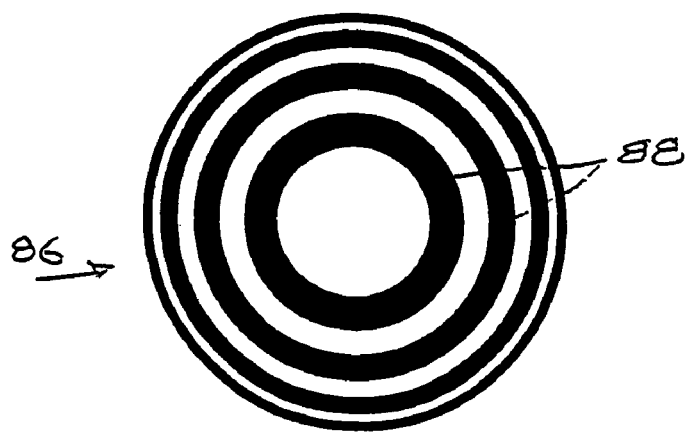

A Fresnel lens 80 is a flat piece of refractive material with concentric circular grooves 82 etched into one side per FIGS. 7 & 8. The shape of the grooves is such that they act as individual prisms, bending light to a common focus. Such lenses can be made with high numerical apertures while remaining lightweight and inexpensive to fabricate. In a microscope, this element can replace the objective lens 44 in FIGS. 3 & 4 and can perform the same function, by focusing light down through the imaging lens 46.

Zone plates (such as zone plate 86 shown in FIGS. 9 & 10) come in several different designs and are often called by various names (such as Gabor or Fresnel zone plates). These optical elements have a pattern of concentric circles (such as circles 88 per FIG. 10) spaced at particular distances from their common center and focus light by diffraction. The zonal patterns can be produced by either amplitude (binary or continuous) or phase modulation. The various types all have zones of constant area equal to $\pi\lambda f$, where f is the focal length of the plate at wavelength λ. More information on the various types of plates, and their properties can be found in many texts and references but the important feature is their ability to focus light using diffraction. Since they focus light, they can be used in place of, e.g. the refractive objective 44 of FIGS. 3 & 4, to produce a microscope with similar properties. Zone plates are often used for focusing X-rays, so a microscope utilizing such an objective element is believed able to use the extremely small wavelengths of X-rays to extend the microscope to very high resolutions per the invention.

The holographically corrected microscope can have a large working distance, and as such the diameter of the objective can be large so that the numerical aperture is large. Where the numerical aperture is large, very small details can be resolved. A large working distance means that this microscope can have applications in fields where a high magnification is desired, but close proximity to the sample is impossible. For example—viewing objects inside vacuum systems (from the outside), situations which could cause damage to the microscope such as explosive, corrosive, radioactive or other physically violent phenomena or various other applications (including gas-filled systems, eg. of argon) where it might be desirable to have the microscope located some distance away so that real-time operations can be carried out directly on the sample. It is also possible to incorporate a vacuum window into the recording scheme, so as to correct for aberrations present in the window. This is done by having the window present during recording, in the same position it would be in for reconstruction. For example, if the window is placed between the spatial filter and objective lens during recording, on reconstruction, the hologram can correct for aberrations present in the window as well as in the objective. This makes it possible to have the microscope on the outside of a vacuum (or other) chamber, viewing images accurately.

The technique described here involves using a large inexpensive objective, which may or may not have a poor surface quality, and which can have large amounts of geometrical aberrations present when imaging an object. In this system, both aberrations are recorded and compensated for by a hologram. This creates a microscope with a high resolution and a large working distance at a reduced cost. Furthermore, one design incorporates a curved mirror with the object to be viewed in an off-axis position. Previously, such a scheme could not be achieved simply, and certainly not with a mirror with anything but a perfect surface quality.

In the prior art the working distance of a good quality microscope is, eg. 0.01 in. and its objective is, e.g. 0.1 in. dia. In contrast, the microscope of the present invention can have a long working distance of, e.g. up to ½ to 10 in. or more with an objective of up to 8 in. dia. or more.

The image corrector of the invention thus has several advantages over the prior art in both its refracting and reflecting embodiments, that is:

1. An inexpensive, low quality objective can be used which would ordinarily be useless as the objective for a microscope.

2. A simple, one-piece objective can be used in spite of the fact that ordinarily this would give rise to geometrical aberrations (such as spherical aberration) which would excessively degrade the image quality.

3. The large working distance allows this microscope to view objects from a large distance, but still maintain a high resolution. Other high resolution microscopes require the sample to be very close to the objective.

4. The objective can be made large, along with the working distance, to maintain a high resolution.

5. The large working distance also allows the object to be illuminated in a more convenient manner. There is more room for lighting as well as simultaneous direct manipulation of the object.

6. The microscope can be adapted to work with a vacuum (or gas-filled) system window placed between the objective and the sample. This makes it possible to view objects under high magnification.

Also for the reflecting microscope design;

1. A high numerical aperture mirror can be used in an off-axis configuration which would ordinarily introduce excessive off-axis wavefront aberration (such as astigmatism and coma) for high quality imaging.

2. A mirror can be made to give high reflectance at shorter wavelengths than inexpensive glasses transmit, so the reflecting objective could be used in the ultraviolet or with x-rays to increase resolution.

Also for designs having other types of objectives;

1. Fresnel lenses and zone plates are inexpensive elements which can be fabricated with high numerical apertures which gives rise to microscopes with very high resolution.

2. These elements can also make it possible to use the microscope at UV and x-ray wavelengths which increases the resolution of the instrument considerably.

Also the image corrector of the invention can be mounted on a still-frame or movie camera and act like a high magnification, large focal length lens. It can also act as a cross between a microscope and a telescope.

As to the Embodiments of FIGS. 11-16

The writing of the hologram (FIG. 11) begins with a source of coherent light 131, such as a laser 130, which is split into two separate beams 133 & 135 by a beamsplitter 132. The first of these laser beams (the object beam 135) is directed through an optically flat array of pinholes 142 to illuminate the objective element 144. It is these pinholes which are the key to the operation of the microscope. The pinholes are preferably each smaller in diameter than and separated by less than the resolution limit of a perfect objective of the same numerical aperture. By doing this, what the objective lens effectively "sees" is an evenly illuminated area, with no discernable detail. Ideally, the pinholes should be in a random pattern as well which ensures an even illumination of the objective. Such arrays of pinholes are currently available. The objective element can be either refractive (such as the lens 44 shown in FIG. 11 or reflective (a curved mirror). The objective focuses the light, as best it can, through a good quality lens 146, which images the objective lens onto a suitable light sensitive material, eg. film 140. Such material can be one of many suitable media for recording interference patterns such as photosensitive films, nonlinear crystals, photopolymers or spatial light modulators.

The size of the pinhole array represents the field of view of the final instrument. Also, the larger the size of the array, the larger the spread of image light passing through the imaging lens, eg. lens 146.

The second beam 133 from the beamsplitter 132 is directed through a second array of pinholes 134 and then onto a diffraction limited collimating lens 136. Though the array of pinholes in this case does not have to have to be identical to the array 142 in the object beam, their size and separation is preferably smaller than the collimating lens 136 can resolve. The resulting reference beam 137 is then made to interfere with the object beam 139 at the film 140. In the diagram this is made possible with a single directing mirror 138, but more or less than one mirror can be employed. The recorded interference pattern is the hologram 141. Thus, the hologram 141 is now a recording of the wavefront error of the objective 144 for all field positions encompassed by the array of pinholes.

After recording, the reconstruction process takes place (FIG. 12). The pinhole array 142 in the recording process has been removed and replaced by the object (or article) 155 we wish to view. The object 155 is illuminated by a laser, either from behind or from the front, as desired. The light from the object passes through the objective 144 and imaging lens 146 to the hologram 141. It is important to note that the relative positions of the objective 144, imaging lens 146 and hologram 141 are preferably kept the same as they were for the recording of the hologram 141. Since the beam incident on the hologram has the same wavefront error as the original object beam used to record the hologram, it will diffract off the hologram to reconstruct the original, diffraction limited reference beam, with article information retained. By focusing this beam down with a high quality lens 148, a diffraction-limited real image of the object can be captured in a suitable manner at the image plane 150. An alternative would be to view the virtual image directly using an eyepiece lens 152.

Since the wavefront aberrations from all points of the field of view have been recorded, the hologram will correct for the whole field at all times. This will mean that the device operates like a conventional microscope, but with a large field of view. The exact magnification achievable depends on the power of the lenses (Parts 144, 146 and 148) as well as the actual distances used (eg. between parts 142 & 144 and 144 & 146) and the field of view will depend on the size of the pinhole array 142, eg. per FIGS. 11 & 12.

As mentioned previously, the objective can be a concave mirror 160 and the recording and reconstruction set-up for this reflecting microscope are shown in FIGS. 13 and 14 respectively. In this case (per FIG. 13), the array of pinholes 162 which illuminate the mirror 160 is on the same side as the imaging lens 164. In order to separate the incident and reflected light, the mirror 160 is tilted into an off-axis configuration. This will introduce a large amount of off-axis aberrations for a heavily curved mirror, but these are recorded and corrected for by the hologram 166 as is done by the hologram 141 of the refractive system of FIG. 12. However, it is noted that this off-axis angle is not essential (it could be a zero angle, on-axis arrangement), but can be incorporated to avoid the object's obscuring the return light under observation.

Then the pinhole array 162 is removed and replaced by the object or article 170 to be viewed at the image plane 165, per FIG. 14. The remaining lenses of the optical systems shown in FIGS. 13 & 14 correspond to those shown and described above relative to FIGS. 11 & 12.

Instead of a conventional lens or even a curved mirror as the objective, any optical element which can image objects, though badly, can be used as the objective element. Once again, any aberrations present can be corrected for using this technique, resulting in a near perfect microscope. Examples of other such focusing elements are Fresnel lenses and Zone plates discussed above.

As noted above, a Fresnel lens 80 is a flat piece of refractive material with concentric circular grooves 82 etched into one side per FIGS. 7 & 8. The shape of the grooves is such that they act as individual prisms, bending light to a common focus. Such lenses can be made with high numerical apertures while remaining lightweight and inexpensive to fabricate. In a microscope, this element can replace the objective lens 144 in FIGS. 11 & 12 and can perform the same function, by focusing light down through the imaging lens 146.

As noted previously, zone plates (such as zone plate 86 shown in FIGS. 9 & 10) come in several different designs and are often called by various names (such as Gabor or Fresnel zone plates). These optical elements have a pattern of concentric circles (such as circles 88 per FIG. 10) spaced at particular distances from their common center, and focus light by diffraction. The zonal patterns can be produced by either amplitude (binary or continuous) or phase modulation. The various types all have zones of constant area equal to $\pi\lambda f$, where f is the focal length of the plate at wavelength $\lambda$. More information on the various types of plates, and their properties can be found in many texts and references but the important feature is their ability to focus light using diffraction. Since they focus light, they can be used in place of, e.g. the refractive objective 144 of FIGS. 11 & 12, to produce a microscope with similar properties. Zone plates are often used for focusing X-rays, so a microscope utilizing such an objective element is believed able to use the extremely small wavelengths of X-rays to extend the microscope to very high resolution per the invention.

A further feature of this microscope is the possibility of making small measurements of the height of any points on the object. For this mode of operation, the recording is the same as before per FIG. 11 but the reconstruction is modified as shown in FIG. 15. The original reference beam 137 remains, on reconstruction, and a small portion of this beam will be transmitted through the hologram 141, interfering with the reconstructed reference beam (with the object information imprinted on it) 149, producing fringes over the image. If the original pinhole array was a flat substrate, these fringes represent a contour map of the height of points over the object. Using phase shifting interferometry techniques, the height of various features on the object can be calculated to a fraction of a wavelength of light. Once again, this figure (FIG. 15) shows the set-up for a refracting objective, but this concept applies to the other types of objectives mentioned above. Also an example of the fringed image 90 of the invention, shown in FIG. 16, appears in the image plane 150 of FIG. 15.

This microscope can have a large working distance, and as such, the diameter of the objective can be large so that the numerical aperture is large. Where the numerical aperture is large, very small details can be resolved. A large working distance means that this microscope can have applications in fields where a high magnification is desired, but close proximity to the sample is impossible. For example objects can be viewed inside vacuum systems (from the outside) in situations which could cause damage to the microscope such as explosive, corrosive, radioactive or other physically violent phenomena, or in various other applications (including gas-filled systems of, eg. argon) where it is desirable to have the microscope located some distance away, so that real-time operations can be carried out directly on the sample.

If the recording process takes place with a vacuum window between the pinhole array and the objective, such an arrangement can allow the hologram to correct for aberrations present in the window as well as in the objective. This makes it possible to have the microscope on the outside of a vacuum (or other) chamber, viewing accurate images.

In the prior art, the working distance of a good quality microscope is, eg. 0.01 in. and its objective is, e.g. 0.1 in. dia. In contrast, the microscope of the present invention can have a working distance of, e.g. up to ½ to 10 in. or more with an objective of up to 8 in. dia. or more.

The instrument described herein involves using a large inexpensive objective, which may or may not be of poor surface quality, and which will have a large amount of geometrical aberrations present when imaging an object from a large distance. In this system, both aberrations are recorded and compensated for by a hologram. The method of recording the hologram uses an array of point sources over a large area. This creates an inexpensive microscope with large resolution over a large field of view. Furthermore, one design incorporates a curved mirror with the object to be viewed in an off-axis position. Previously, such a scheme could not be achieved without expensive multi-element optics, and certainly not with a single mirror even with a perfect surface quality. Lastly, by producing an interference pattern between one of the write-beams and the image beam, it is possible to extract height information about all points on the object simultaneously.

The image corrector of the invention thus has several advantages over the prior art in both its refracting and reflecting embodiments, that is:

1. An inexpensive, low quality objective can be used which would ordinarily be useless as the objective for a microscope.

2. A simple, poor-surface quality, one-piece objective can be used in spite of the fact that ordinarily this would give rise to geometrical aberrations (such as spherical aberration) which would excessively degrade the image quality. Multi-element combinations could be used if necessary, but one of the main features of this microscope is the cost savings resulting from using just a single element.

3. The large working distance allows this microscope to view objects from a large distance, but still maintain a high resolution. Other high resolution microscopes require the sample to be very close to the objective. Typically, it is possible to have an increase in working distance of one to two orders of magnitude over conventional objectives with the same numerical aperture.

4. The large working distance makes it possible to have the microscope view objects, or project images inside vacuum chambers (or gas-filled systems). The addition of a vacuum (or gas-filled) window into the system is quite simple and will not greatly affect the operation of this device.

5. The large working distance also allows the object to be illuminated in a more convenient manner. There is more room for lighting as well as simultaneous direct manipulation of the object.

6. The use of a pinhole array results in a microscope with a large field of view, while maintaining the advantages above.

For the reflecting microscope design;

1. A high numerical aperture mirror can be used in an off-axis configuration which would ordinarily introduce excessive off-axis wavefront aberration (such as astigmatism and coma) for high quality imaging.

2. A mirror can be made to give high reflectance at shorter wavelengths than inexpensive glasses transmit, so the reflecting objective can be used in the ultraviolet or with x-rays, to increase resolution.

For the designs involving other types of objectives;

1. With Fresnel lenses and certain types of zone plates very high numerical apertures are possible for very little cost.

2. Zone plates in particular make it possible to extend the operation of the microscope to deep-UV and x-ray wavelengths. This increases the resolution of the microscope considerably.

Also the image corrector of the invention can be mounted on a still-frame or movie camera and act like a high magnification, large focal length lens.

Thus the present invention provides an optical microscope designed to provide a large field of view and high resolution while maintaining a large working distance with an inexpensive objective. A further feature of this microscope is the possibility of obtaining real-time, absolute height information about features on the object with a high degree of accuracy.

What is claimed is:

1. A holographic image corrector assembly comprising, a microscope which has
    a) an optical system having an objective and an imaging lens spaced therefrom, followed by a recording medium spaced from said imaging lens,
    b) an array of pinholes mounted before said objective,
    c) means for recording the characteristics of said objective by sending a first laser beam through said array and through said objective or reflecting said beam therefrom and through said imaging lens to form an object beam,
    d) means for intersecting said object beam with a reference coherent laser beam in said recording medium to form a hologram of said objective,
    e) means to replace said array with an article and
    f) means to illuminate said article with a laser beam of the same wavelength as said above laser beams so that light therefrom passes through or reflects off said objective and through said imaging lens and diffracts through or off said hologram and provides a corrected image of said article for viewing.

2. The image corrector of claim 1 wherein said objective is a lens.

3. The image corrector of claim 1 wherein said objective is a concave mirror.

4. The image corrector of claim 3 wherein said mirror is tilted to an off-axis position.

5. The image corrector of claim 1 wherein said optical system is at a working distance from said article of up to 10 in. or more.

6. The image corrector of claim 5 employed for viewing objects at a distance including those inside a vacuum system or in an unstable atmosphere.

7. The image corrector of claim 1 wherein said objective is up to 8 in. or more in diameter.

8. The image corrector of claim 1 wherein a first array of pinholes is mounted before said objective and a second array of pinholes is mounted in the path of the reference beam before it interferes with said object beam.

9. The image corrector of claim 1 wherein said objective is selected from the group consisting of a mirror, a lens, a fresnel lens and a zone plate.

10. A method for image correction comprising, in a microscope, having an optical system with an objective and an imaging lens spaced therefrom followed by a recording medium spaced from said imaging lens and an array of pinholes mounted before said objective;
    a) recording the characteristics of said optical system, by sending a first laser beam through said array of pinholes and through said objective or reflecting said first beam therefrom and then through said imaging lens, to form an object beam,
    b) intersecting said object beam with a reference laser beam in said recording medium to form an interference pattern or hologram thereof,
    c) replacing said array with an article and
    d) illuminating said article with a laser beam of the same wavelength as said above laser beams so that light therefrom passes through or reflects off said objective and through said imaging lens and diffracts through or off said hologram, to provide a corrected image of said article.

11. The method of claim 10 employing said objective at a working distance of at least 10 in. from said article.

12. The method of claim 10 wherein said object beam is passed through an array of pinholes to illuminate the objective and the reference beam is passed through an array of pinholes before interfering with said object beam.

13. The method of claim 10 wherein said object beam and said reference beam are each passed through a pinhole array to obtain a microscope of relatively large field of view.

14. The method of claim 10 wherein during step d) thereof, said reference beam is also directed at such hologram as before, to form an additional interference pattern of light and dark fringes superimposed on said image, to provide a contour plot thereof.

15. A method for image correction comprising, in a microscope, having an optical system with an objective and an imaging lens spaced therefrom, followed by a recording medium spaced from said imaging lens, a first array of pinholes mounted before said objective, a second array of pinholes mounted before a collimating lens and a beam splitter mounted before both of said arrays;
    a) passing a laser beam through said beam splitter to form separate beams 1 & 2,
    b) directing beam 1 through said first array of pinholes to illuminate said objective and through said imaging lens, spaced from said objective, to define an object beam,
    c) directing beam 2 through said second array of pinholes to said collimating lens to define a reference beam and then into interference with said object beam in said recording medium to define a hologram,
    d) removing said first array of pinholes and replacing said pinhole array with an article to be viewed and
    e) illuminating said article by a laser beam of the same wavelength as said above laser beams so that light therefrom passes through or reflects off said objective and through said imagining lens to diffract through or off said hologram to reconstruct the original reference beam but with article information retained, to correct for defects in said objective and to provide an accurate image for viewing.

16. A new use for holographic image correction comprising, a method for image correction in a microscope having an optical system with an objective and an imaging lens spaced therefrom followed by a recording medium for a hologram, spaced from said imaging lens and an array of pinholes mounted before said objective; which include the steps of
    a) recording the characteristics of said optical system by sending a first laser beam through said array of pinholes and through said objective or reflecting said first beam therefrom and then through said imaging lens spaced therefrom to form an object beam, b) intersecting said object beam with a reference laser beam in said recording medium to form an interference pattern or hologram thereof,
c) replacing said array with an article and
d) illuminating said article with a laser beam of the same wavelength as said above laser beams, so that light therefrom passes through or reflects off said objective and through said imaging lens and diffracts through or off said hologram, to provide a corrected image of said article.

* * * * *